(12) United States Patent
Buchwald et al.

(10) Patent No.: US 6,543,747 B2
(45) Date of Patent: Apr. 8, 2003

(54) VALVE ACTUATOR APPARATUS

(75) Inventors: David W. Buchwald, Aurora, IL (US); Purushottam P. Savalia, Aurora, IL (US)

(73) Assignee: Henry Pratt Company, Aurora, IL (US)

(*) Notice: Subject to any disclaimer, the term of this patent is extended or adjusted under 35 U.S.C. 154(b) by 155 days.

(21) Appl. No.: 09/725,087

(22) Filed: Nov. 29, 2000

(65) Prior Publication Data

US 2001/0030310 A1 Oct. 18, 2001

Related U.S. Application Data

(60) Provisional application No. 60/167,919, filed on Nov. 30, 1999.

(51) Int. Cl.[7] .............................................. F16K 31/00
(52) U.S. Cl. ........................................ 251/279; 251/304
(58) Field of Search ................................. 251/279, 304

(56) References Cited

U.S. PATENT DOCUMENTS

| 4,561,467 A | * | 12/1985 | Rouse et al. ................. 251/279 |
| 4,765,589 A | * | 8/1988 | Sauze ........................... 251/279 |
| 4,945,874 A | * | 8/1990 | Nishitani et al. ............ 251/279 |
| 5,797,585 A | * | 8/1998 | Auvity ......................... 251/279 |
| 6,135,414 A | * | 10/2000 | Mohtar ........................ 251/279 |

* cited by examiner

Primary Examiner—Henry C. Yuen
Assistant Examiner—John Bastianelli
(74) Attorney, Agent, or Firm—Troutman Sanders LLP; Michael S. Kerns; Gerald R. Boss

(57) ABSTRACT

A valve actuator includes two parallel tracks in each of which a slider block is disposed to slide with a pivot pin and nut carried between the slider blocks; a valve stem engaging member is provided with an arm terminating in a sleeve in which a pin having an eccentrically shaped central portion is disposed; from each slider block, an arm extends to connect to an end of the pin in the sleeve; a set screw is employed to fix the position of the pin once the angular position of the arms is set to obtain the optimum mechanical advantage.

13 Claims, 3 Drawing Sheets

VALVE ACTUATOR APPARATUS

This Application claims the benefit of Ser. No. 60/167,919, filed Nov. 30, 1999.

FIELD OF THE INVENTION

The present invention relates to actuators for valves and similar devices and, more specifically, to an adjustable linkage that will assure accurate operation of the valve through many cycles.

BACKGROUND OF THE INVENTION

In a large number of industrial sites, valves, often in remote locations, require actuation by electrical or hydraulic devices. It is desirable, of course, that such devices operate reliably through many cycles to reduce the cost of attending to these devices and their associated valves. To achieve this, the actuator device must be properly installed and positioned relative to the valve elements it is intended to operate. In some types of environments, valves are employed that require substantially precise manipulation in order to effectively control fluids in their associated conduits. This is particularly true in fluid metering operations.

For many types of valves, the actuation device will only require infrequent operation so that the valve will stand idle for long periods. In other situations, the fluid being handled by the conduit may be of the consistency that renders operation of the valve difficult. In either case, a valve actuator is likely to encounter elevated torque initiation of a valve opening or closing operation. In such circumstances, it is important that the installation of the valve actuation device be accurate and in proper alignment to assure the maximum mechanical advantage upon actuation.

In the past, valve actuators required time consuming installation to assure accurate operation. Adjustment of the actuators was often difficult to achieve so as to assure such accurate operation over many opening and closing cycles.

SUMMARY OF THE INVENTION

The present invention provides a valve actuator that provides a solution to a number of the design and operational difficulties encountered in prior art actuators. Specifically, the present invention provides an adjustable linkage for transmitting motion from a power source which may be either hydraulic, mechanical or electrical to a valve stem to accurately effect rotation of the valve stem while minimizing stress to the linkage itself. In one embodiment, a rectilinear track or tracks are provided in housing walls with the tracks extending parallel to each other. Slider members are positioned in each track for reciprocating movement and are moved in their respective tracks by an external actuator such as an electric motor mounted externally of the housing or by a piston rod which will be hydraulically actuated. The slider members will carry a pivot pin to which one or more linkage arms are connected. The other end of the linkage arms are connected to a lever arm through another pivot pin and this latter lever arm is connected to the operating stem of a valve. The pivot pins' cross-sections are eccentrically shaped over a portion of the length of a respective pin to allow precise adjustment of the orientation of the linkage arms relative to the slide groove and the connecting lever arm connected to the valve stem. This will assure proper adjustment of the linkage arm and lever arm to obtain the greatest possible mechanical advantage provided by these members. In such a condition, the maximum torque will be available to operate the stem and the stress imposed on the linkage and lever arms will be reduced.

The foregoing and other advantages will become apparent as consideration is given to the following detailed description taken in conjunction with the accompanying drawings, in which:

DETAILED DESCRIPTION OF THE INVENTION

Figure 1:
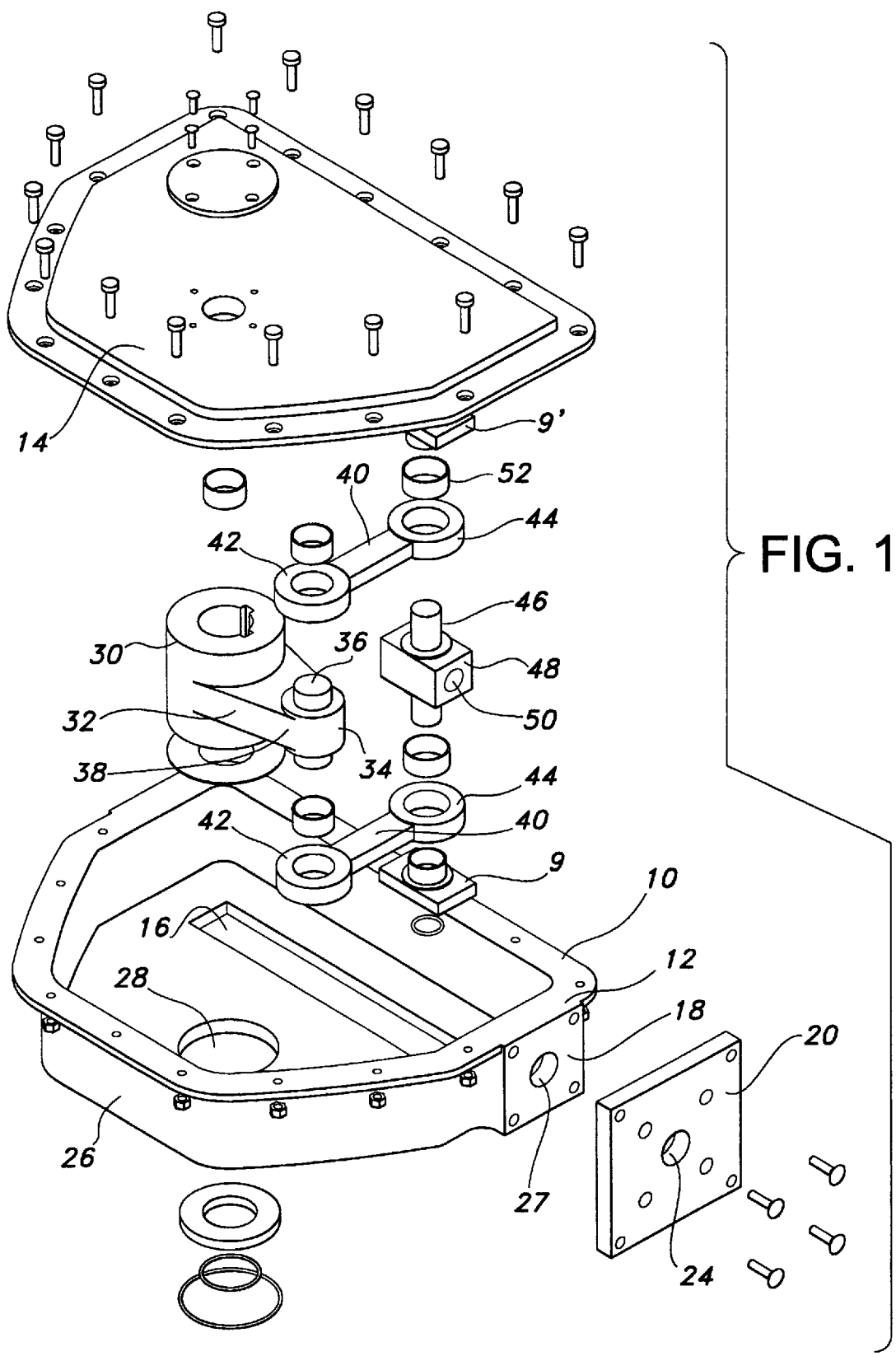
FIG. 1 is an exploded view showing the elements of the present invention.

Referring to FIG. 1, an exploded view of the main elements of the valve actuator of the present invention is shown. The actuator includes a housing 10 having a hollow interior surrounded by an attachment flange 12 for cooperation with a similarly shaped flange on the lid 14.

In the base wall 26 of the housing 10 there is provided a rectangular track 16 in which a slider block 9 is shaped to fit for sliding movement along the track 16. An identical track is formed in the lid 14 for receiving an identical slider block 9'. The side of housing 10 is provided with an opening plate 18 to which an adapter plate 20 may be secured and which is provided with an opening 27 in alignment with the opening 24 in plate 20 it is through openings 24 and 27 that a drive arm or shaft from an electric motor or hydraulic piston is inserted so as to move in a reciprocating path as described below.

The base wall 26 of the housing 10 is also provided with an opening 28 through which a valve stem will be inserted to engage the interior of hollow sleeve 30 of a lever 32. Preferably, as shown, the sleeve 30 of lever 32 surrounds the projecting end of a valve stem to assure proper interaction with the valve stem in use. The opposite end 34 of the lever 32 is formed or is provided with sleeve shaped to receive a pin 36 described below. The side wall of the sleeve 34 is provided with a set screw such as at 38 to secure the pin 36 in a selected position.

A shown in FIGS. 3a and 3b, the pin 36 will be eccentrically shaped relative to its axis of rotation to provided accurate adjustment of the linkage members as described below.

The linkage arm 40 is provided at its opposite ends with circular openings 42 and 44. Preferably, an identically shaped linkage arm 40' is also provided with similar openings 42' and 44' with the openings 42 and 42' respectively being mounted on the upper and lower ends of the eccentric pin 36. The openings 44 and 44' engage the opposite end of a pin 46 which is rotatably carried in a slider nut 48. The slider nut 48 includes a bore 50 into which will be inserted the end of a piston rod or drive shaft of an electric motor, not shown. The rod or shaft will exert linear force on the slider nut 48 to move the linkage arms 40 and 40' and lever arm 32 counterclockwise as viewed in FIG. 2. A number of bearing rings such as that indicated at 52 may be employed between the elements described above between which there is relative movement such as rotation in the operation of the actuator.

Figure 2:
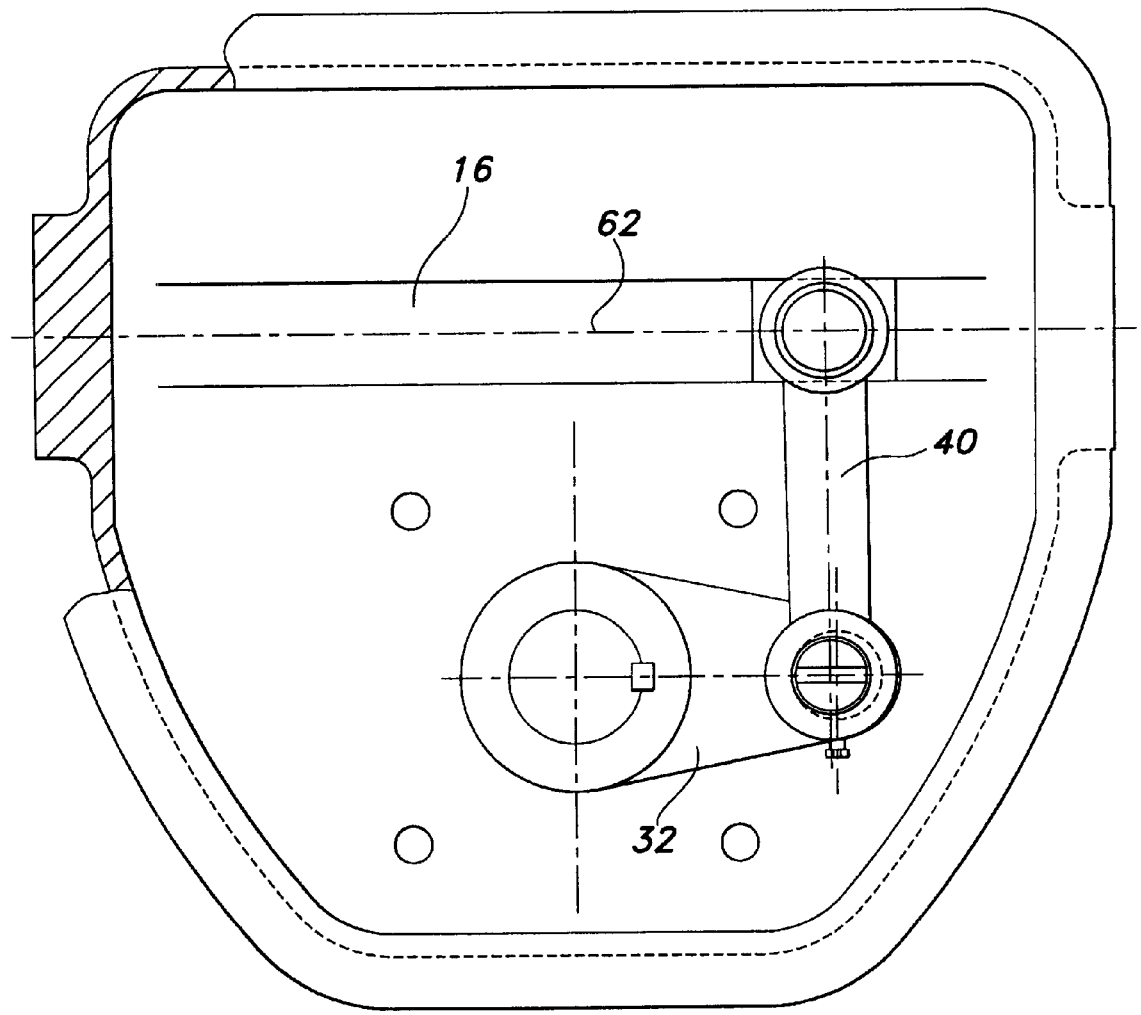
FIG. 2 is a top plan view of the assembled actuator of the present invention.

Referring to FIG. 2, there shown a top plan view of the assembled elements of FIG. 1 with the elements positioned to produce the greatest leverage or efficiency in operation. Typically, this is required when the valve is in a closed position and must be moved to an open position. The actuator device is considered of optimal weight and size when it is the smallest size that can produce the required valve torque and where the point of highest efficiency is matched to the point of highest valve torque.

Figure 3A:
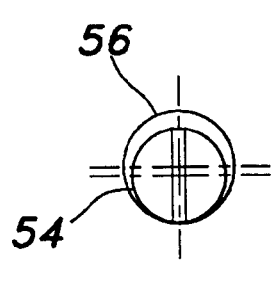
FIG. 3a and 3b are, respectively, end and side elevational views of an eccentric lever pin used in the present invention.
Figure 3B:
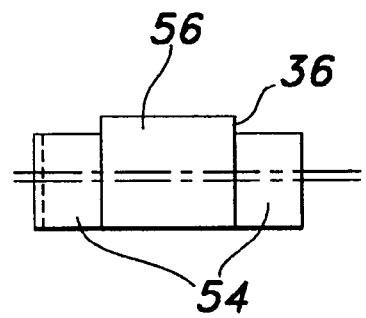

To achieve this in the configuration of the present invention, one or both of the pivot pins 36, 46 are eccentrically shaped as shown in FIGS. 3a and 3b. In particular, the pin 36 has cylindrical end portions 54 and a centrally located eccentric portion 56. As shown in FIG. 3a, the eccentric portion 56 extends outwardly to a greater radius the end portion 54 but has one side co-planar with the end portion 54. The pin 46 will be identically shaped and will therefore not be further described.

Figure 4:
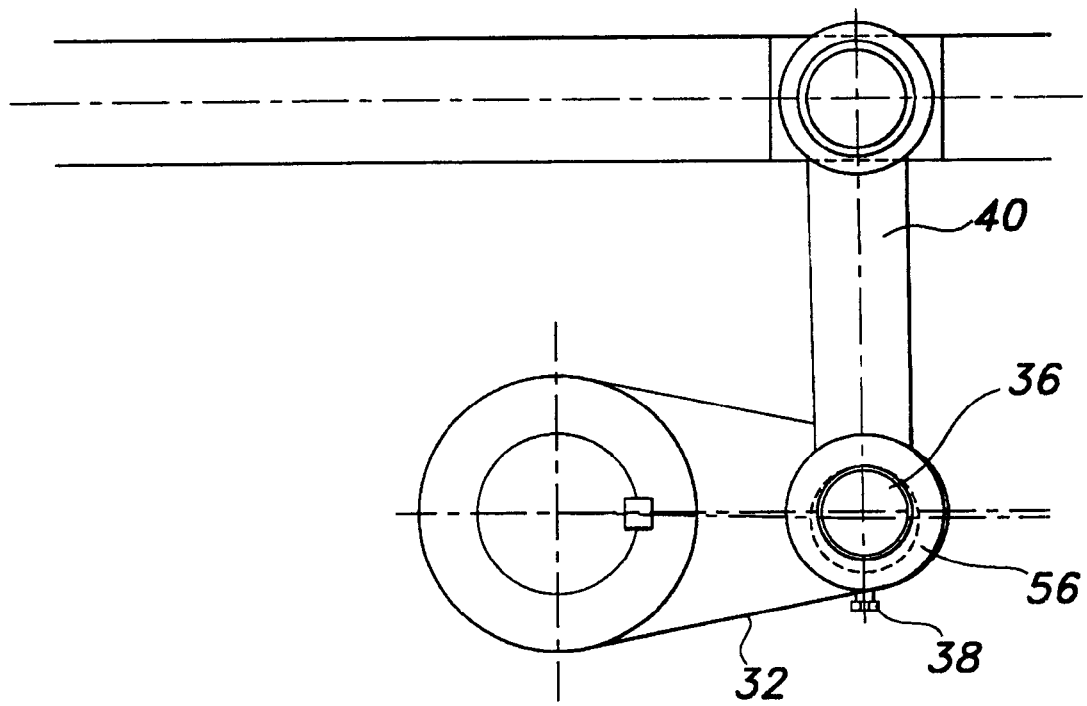
FIG. 4 is a schematic illustration of the adjustment provided to an assembly of the present invention.

Referring to FIG. 4, a user will be able to obtain the maximum mechanical advantage of the lever arm 32 by adjusting the pin 38 and/or 46 by rotation of the respective pin to place the linkage arms 40 and 40' at right angles to the axis of the grooves 16. The rotation essentially changes the effective length of the arms 40 and 40' to avoid a condition where the arm is too long or short. In FIG. 4, a 90 degree rotation of the pin 36 is illustrated with the eccentric portion 56 facing away from the body of the lever arm 40 as well as the underlying lever arm 40'. This assures the maximum mechanical advantage in the operation of the linkages 32, 40 and 40'. With this arrangement, the actuator will have a specific stroke line relative to a valve stem. Thus, the use of the eccentrically shaped pin 36 will allow the user to compensate for inherent manufacturing tolerances in the various connected elements. Typically, the accumulation of the manufacturing tolerances in each of the elements results in lever orientation that is not exactly parallel to the machined groove 16 in the housing 10 and cover 14 when the valve is a closed position. Rotation of the pin 36 will allow the user to adjust the lever 32 so that it extends exactly parallel to longitudinal axis 68 of the groove 16. In this condition, the actuator will move the valve stem the full 90 degrees between the closed and open positions and avoid the condition where the valve is either not totally closed or not fully open.

It will be appreciated that an eccentric pin 36 may be located at the opposite end of the arms 40 and 40', that is, in the slider block 48 to achieve the same results. Further, it will be appreciated that the adjustment of the length of the stroke can be modified by a selection of the degree of eccentricity provided in the pins 36 and 46.

Having described the invention, it will be apparent to those skilled in this art that various modifications may be made thereto without departing from the spirit and scope of the invention.

What is claimed is:

1. A valve actuator comprising a track receiving a slider member for reciprocating movement along said track, a pin carried by said slider member, a first pivot arm having one end pivotably connected to said pin and an opposite end pivotably connected to another pin, a valve stem engaging member rotatably carried by said actuator and having an actuation arm pivotably connected to said another pin, said another pin having a central portion and opposite ends, said first pivot arm engaging one, of said ends, said central portion being eccentrically shaped so that rotation of said another pin will move said first pivot arm relative to said one and said another pin.

2. The invention as claimed in claim 1 wherein each said pivot arm is provided with a circular opening for receiving said respective pin.

3. The invention as claimed in claim 2 wherein said opening of said first pivot arm that engages said another pin surrounds one of said opposite ends.

4. The invention as claimed in claim 3 wherein said actuation arm has an end remote from said valve stem engaging member, said remote end having an opening receiving said central portion of said another pin.

5. The invention as claimed in claim 4 wherein said end remote from said valve stem engaging member is provided with a sleeve in which said another pin is located, said sleeve including a set screw for releasably engaging said another pin.

6. A valve actuator comprising a housing having a pair of parallel extending tracks, a slider member disposed to slide in each said track, a pin extending between said slider members and being carried by said slider members, said pin having a central portion and opposite ends, a pair of pivot arms each having one end pivotally connected to a said opposite end of said first pin in spaced apart relation and extending parallel to each other from said first pin, a valve stem engaging member carried in said housing so as to be rotatable about an axis, said valve stem engaging member having an actuation arm extending therefrom and terminating in a sleeve, another pivot pin being carried in said sleeve and rotatable with respect to said sleeve, said another pin having a central portion that is eccentrically shaped and opposite ends, said pivot arms each having an opposite end provided with an aperture, said aperture of each said opposite end being carried on one of said opposite ends of said another pin so that, upon rotation of said another pin in said sleeve will vary the angular orientation of said pivot arms relative to said pivot pin and said actuation arm.

7. The invention as claimed in claim 6 wherein said housing has oppositely facing walls and a said track is provided on each wall.

8. The invention as claimed in claim 7 wherein said tracks are each formed in said respective wall.

9. The invention as claimed in claim 6 wherein said sleeve is provided with a set screw for securing said another pin in place.

10. The invention as claimed in claim 6 wherein said central portion of said pin is eccentrically shaped.

11. The invention as claimed in claim 6 wherein said opposite ends of said pin are cylindrically shaped.

12. The invention as claimed in claim 6 where said opposite ends of said another pin are cylindrically shaped.

13. The invention as claimed in claim 6 wherein said pin carries a slider block having a bore for connecting said slider block.

* * * * *